United States Patent [19]

Stringer

[11] 4,247,752
[45] Jan. 27, 1981

[54] CONSTANT CURRENT ARC WELDER

[75] Inventor: Loren F. Stringer, Clarence, N.Y.

[73] Assignee: Westinghouse Electric Corp., Pittsburgh, Pa.

[21] Appl. No.: 946,223

[22] Filed: Sep. 26, 1978

[51] Int. Cl.³ .............................................. B23K 9/06
[52] U.S. Cl. ............................. 219/130.33; 219/130.4
[58] Field of Search .................... 219/130.21, 130.31, 219/130.32, 130.33, 130.4

[56] References Cited

U.S. PATENT DOCUMENTS

| 2,458,658 | 1/1949 | Tyrner | 219/130.33 |
| 2,620,465 | 12/1952 | Giroz | 219/130.33 |
| 3,688,180 | 8/1972 | Chiasson et al. | 219/130.4 |
| 3,746,965 | 7/1973 | Okada et al. | 219/130.32 |
| 3,774,007 | 11/1973 | Chiasson et al. | 219/130.32 |
| 3,904,846 | 9/1975 | Risberg | 219/130.33 |
| 3,912,980 | 10/1975 | Crump et al. | 219/130.33 |
| 3,928,746 | 12/1975 | Ericsson | 219/130.33 |
| 4,071,885 | 1/1978 | Bilczo et al. | 219/130.33 |
| 4,109,130 | 8/1978 | Oku | 219/130.21 |

FOREIGN PATENT DOCUMENTS 516369 1/1972 Switzerland .

Primary Examiner—C. C. Shaw
Attorney, Agent, or Firm—C. M. Lorin

[57] ABSTRACT

A constant current arc welder of the type in which arc current is regulated by thyristor phase angle adjustment, includes voltage feedback voltage control and current feedback current control, with automatic transfer from the voltage control mode into the current control mode when current has been established in the arc. A time delay allows smooth transfer to the desired current operative level by limiting the current inrush under an initial current reference and with a chosen feedback control dynamic characteristic current boost is also automatically provided when the arc voltage falls below a predetermined level.

1 Claim, 22 Drawing Figures

CURRENT

CURRENT INRUSH AT START

TIME

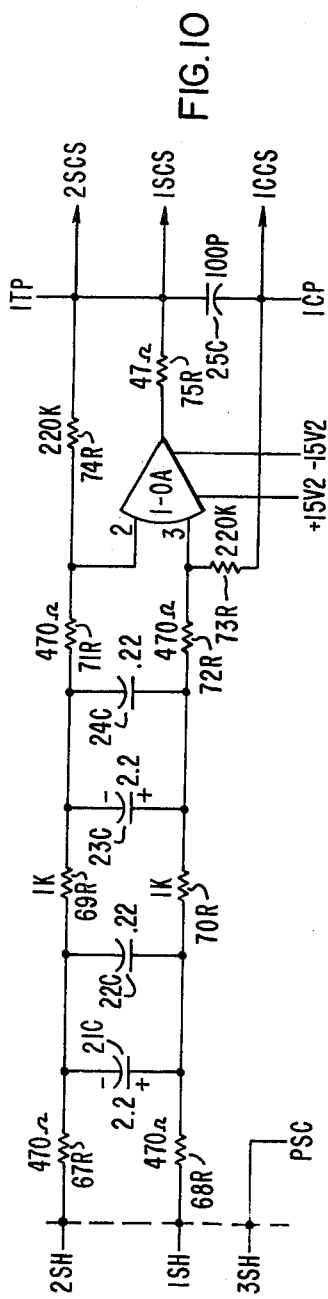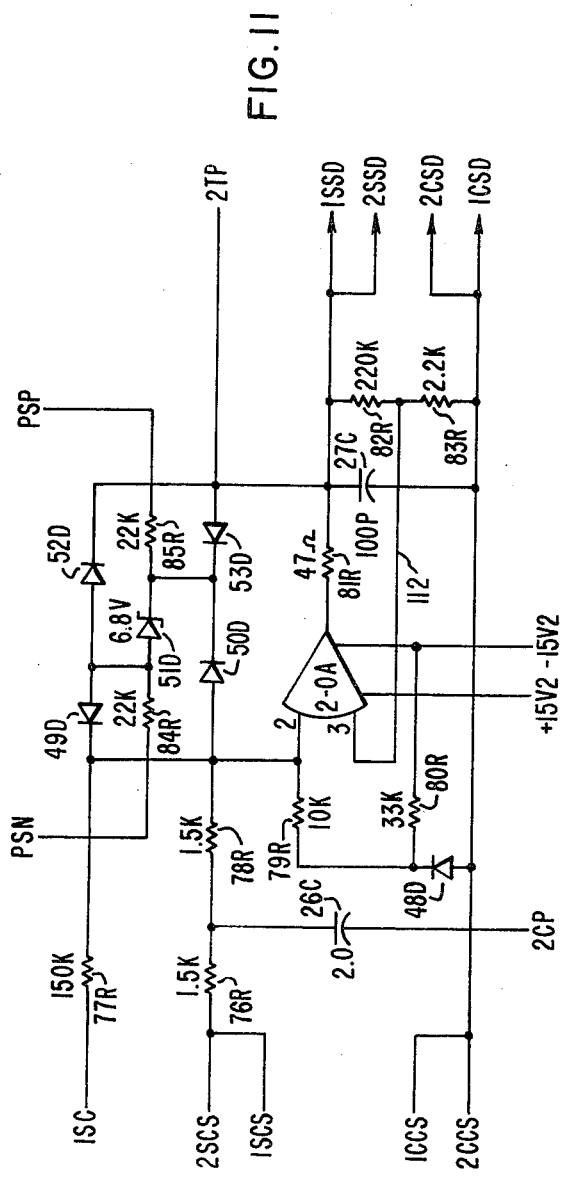

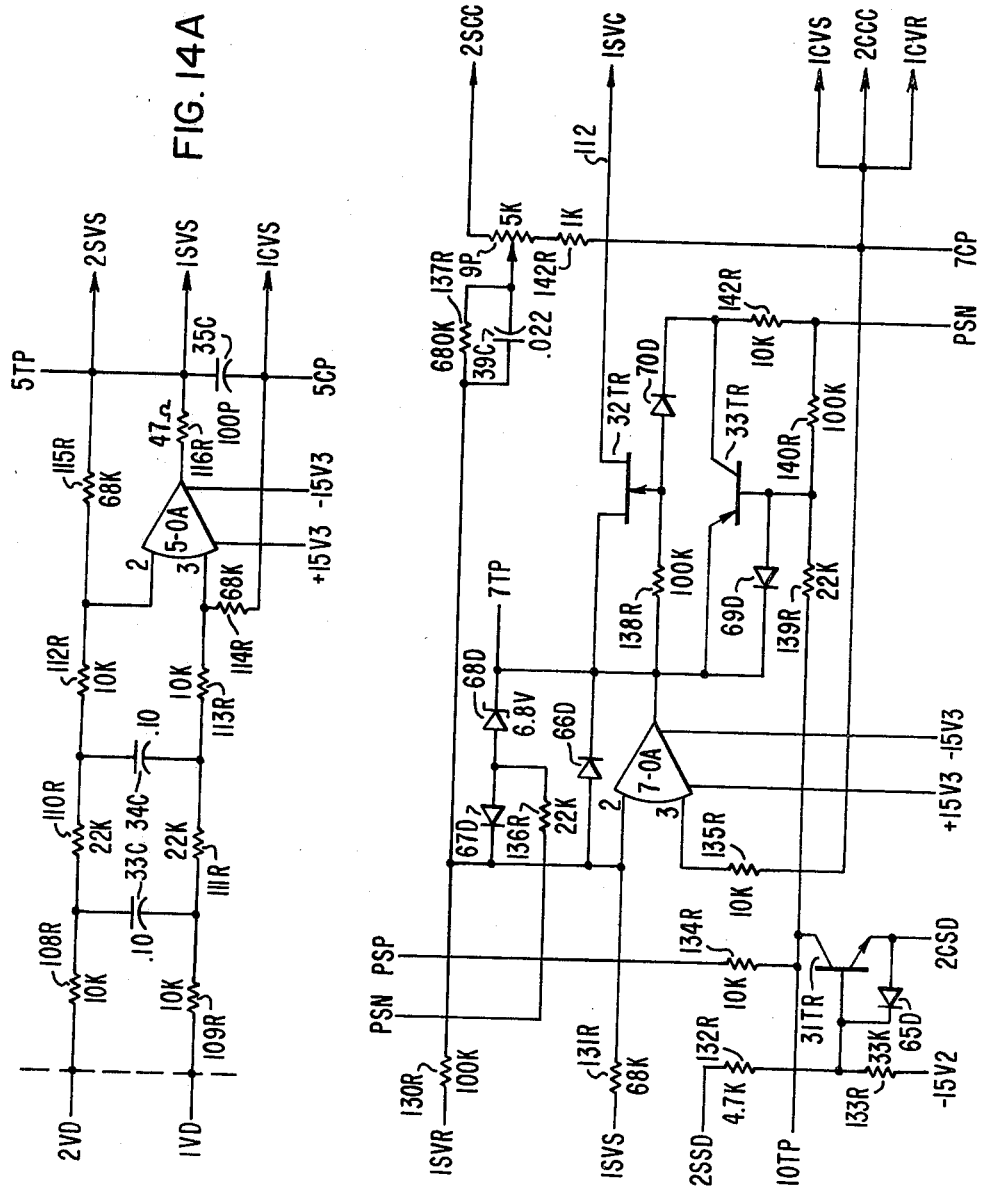

CONSTANT CURRENT ARC WELDER

BACKGROUND OF THE INVENTION

The present invention relates to constant current arc welding in general, and in particular, to arc welders in which voltage and current in the arc zone are controlled or regulated by adjusting the phase angle of thyristors in the power supply for the welding arc.

A constant potential arc welder has been disclosed in copending patent application Ser. No. 891,986, now abandoned, filed by the same applicant on Mar. 31, 1978, in which thyristors are mounted at the secondary side of the autotransformer and where a saturable reactor is serially connected with the arc for limiting current surges during the start and for smoothing out current rectified by the thyristor during the welding operations.

The present invention applies to constant current arc welding. Electric Arc-Welding Apparatus Standard (EWI-1968) of the National Electrical Manufacturers Association (NEMA) defines the constant current arc welder as follows: "A constant-current arc-welding power supply (arc welder) is one which has characteristically drooping volt-ampere curves producing relatively constant current with limited change in load voltage. This type of supply is conventionally used in connection with manual-stick-electrode or tungsten-inert-gas arc welding".

The present invention also relates to direct current arc welders of the type in which current from a main transformer is rectified by thyristors, and regulation of the voltage and/or current is obtained by feedback control from the welding arc zone through controlled adjustment of the thyristor phase angle. Such a power supply has been described in the aforementioned copending application although in the context of a constant voltage arc welder. Thyristor control and the stabilizing effect of a saturable reactor of finite inductance under all practical current conditions have been used to advantage in the arc welder of the aforementioned copending patent application. The same techniques are used with the arc welder according to the present invention. However, in the latter instance since constant current arc welding is the object, specific measures have been taken for arc initiation, for arc stabilization, as well as for insuring an effective welding operation in the normal mode, e.g., while maintaining through the arc the required energy input.

This problem has been encountered in the past and the prior art has given it only piecemeal consideration, and with limited success.

It is an object of the present invention to provide an arc welder in which thyristor control is performed continuously for insuring an adequate current and voltage throughout the welding process.

Another object of the present invention is to provide automatically and successively voltage and current control in relation to welding process conditions.

Still another object of the present invention is to automatically provide current boost through the arc under predetermined boost characteristic for certain low voltage welding conditions.

A further object of the invention is to initiate bumpless transfer from voltage control to current control when initiating the welding process.

A still further object of the present invention is to provide effective and controlled boost current conditions in a constant current mode.

The invention also aims at providing an arc welder capable of monitoring, regulating and controlling the welding operations through phase angle thyristor adjustment continuously in a voltage mode as well as in a current control mode of operation.

SUMMARY OF THE INVENTION

The invention resides in arc welder apparatus in which current is supplied to the welding arc by semiconductor controlled rectifiers (SCR's) gated with a phase angle adjustment in relation to either feedback voltage or feedback current, means being provided responsive to welding current for transferring welding operation from voltage control to current control.

The invention also resides in arc welder apparatus in which current is supplied to the welding arc by semiconductor controlled rectifiers (SCR's) gated with a phase angle adjustable in relation to either feedback voltage or feedback current, means being provided for automatically providing a boost current in relation to a predetermined minimum arc voltage.

PRIOR ART CONSIDERATIONS

It is known from Swiss Patent No. 516,369 of Linde A. G. to operate an arc welder in the constant current mode by controlling the phase angle of SCR devices, the welding arc being supplied with a source of current at a predetermined operating voltage level after having struck the arc with the aid of a parallel source of current, the transition from one source to the second being effected with hysteresis, and decoupling means being provided between the two parallel sources.

It is known from U.S. Pat. No. 3,904,846 of R. L. Risberg to combine a low constant current source and a high constant current source for stick welding, voltage and current feedback control being used to control the SCR's of a chopper as the source of power for the welding arc.

It is known from U.S. Pat. No. 3,912,980 of G. N. Crump et al. in an arc welder in which welding is controlled by adjusting the phase angle of SCR devices under feedback current and feedback voltage control, to use a current detector in a GTAW welding process for starting the current reference with time hysteresis, and at the same time to provide protection against overcurrent.

It is known from U.S. Pat. No. 4,071,885 of D. L. Bilczo et al. to provide either constant voltage or constant current welding while phasing back the SCR devices supplying current to the welding arc.

It is known from U.S. Pat. No. 3,792,225 of J. C. Needham, in dip transfer welding to combine a constant potential source with independent control of short circuit current and arc current, while applying two different and independent sources of power with timed transfer from one operative source to the second.

U.S. Pat. No. 3,746,965 of T. O'Kada et al. shows a constant current arc welder having a closed loop with phase angle control of thyristors, current feedback being used to maintain the voltage feedback gain constant.

U.S. Pat. Nos. 3,688,180 and 3,774,007 of W. A. Chiasson et al. show start current detection in an SCR controlled arc welder and the provision of an auxiliary control circuit to generate boost current when the arc is stricken.

U.S. Pat. No. 3,999,034 of R. E. Barhorst shows a constant current arc welder for TIG welding in which two constant current power supplies are provided independently controlled by SCR phase angle adjustment to generate different current levels, while allowing reverse polarity for a selected duration.

BRIEF DESCRIPTION OF THE DRAWINGS

FIG. 10 is specific to the current sensor of FIG. 9;

FIG. 11 is the start detector;

FIGS. 14A, 14B, 14C show the voltage control section, including voltage sensor, voltage reference panel and voltage controller;

DESCRIPTION OF THE PREFERRED EMBODIMENT

Figure 1:
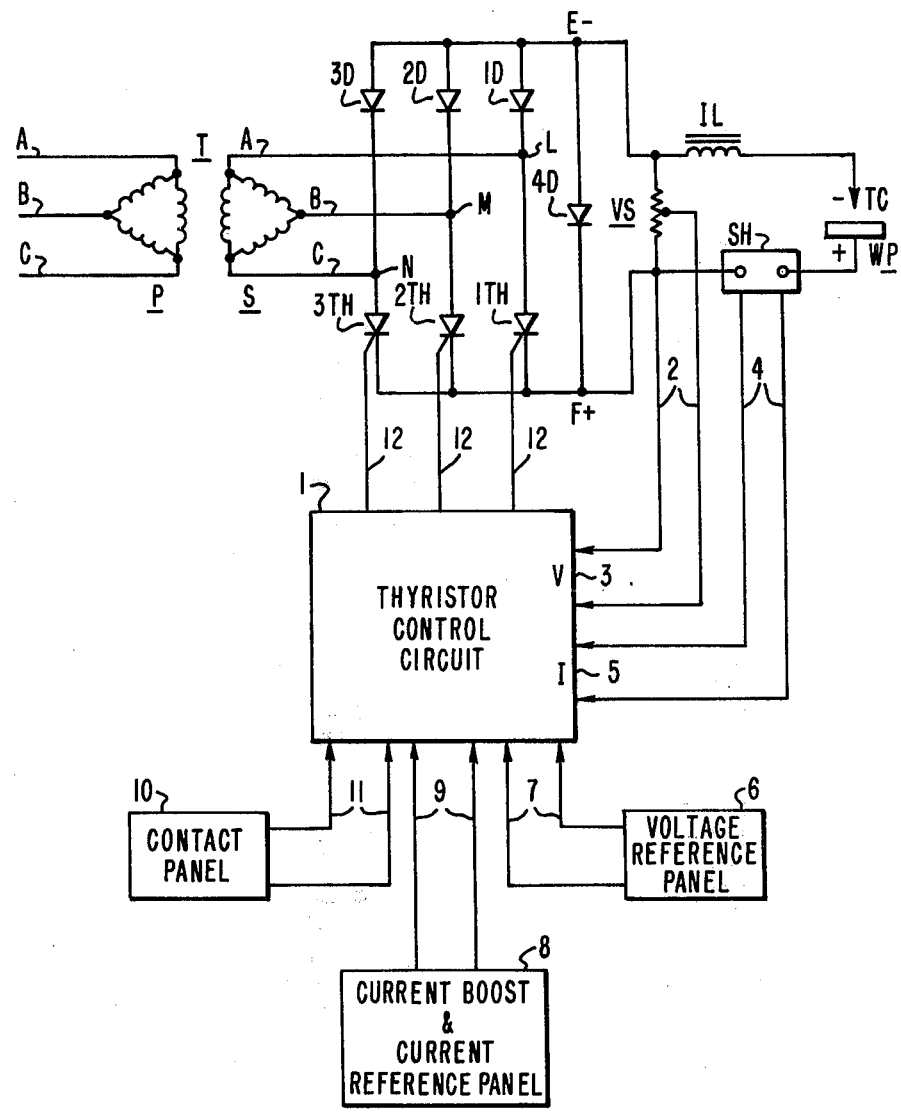
FIG. 1 is a schematic view of a semiconverter system supplying direct current to an arc welder adapted according to the present invention for operation both in the constant potential and in the constant current modes.

Referring to FIG. 1, the general organization of the welding apparatus according to the invention is shown diagrammatically.

Supply lines $L_1$, $L_2$, $L_3$, from a three-phase AC industrial power supply are applied to the primary winding of a transformer T. The secondary, typically arranged in delta, has three windings AB, BC and CA which are connected to the midpoints L, M, N of a semiconverter including three thyristors 1TH–3TH serially connected with respective diodes $D_1$–$D_3$ between the respective phases. The common point E of the anodes of diodes $D_1$–$D_3$ is the negative terminal of the semiconverter. The common point F of the cathodes of thyristors 1TH–3TH is the positive terminal of the semiconverter. Terminal E is connected to the welding torch or electrode TC through a reactor IL of appropriate design and inductance. Terminal F is connected to the workpiece WP through a current sensor SH. A voltage sensor VS is connected between terminals EF. Also, a freewheel diode 4D is connected acrosss E and F from the negative to the positive polarity side.

A thyristor control circuit 1 generates timely and sequentially gate pulses applied to each of the control electrodes of thyristors 1TH, 2TH, 3TH via control lines 12. The sensed voltage derived on lines 2 from VS is applied at the input 3 of circuit 1, while the sensed current derived on lines 4 from SH is applied at the input 5 of circuit 1. Control of the voltage outputted between E and F is effected in accordance with a voltage reference given by the setting on the voltage reference panel 6. Control of the current in the arc is effected in accordance with a current reference given by the setting on the reference panel 8. At 10 as shown, the panel for the various contacts, start, stop, etc... The arc welder will be described hereinafter as relating to a constant current DC welder.

FIG. 2 illustrates with curves the operation of the circuit of FIG. 1.

Figure 2A:
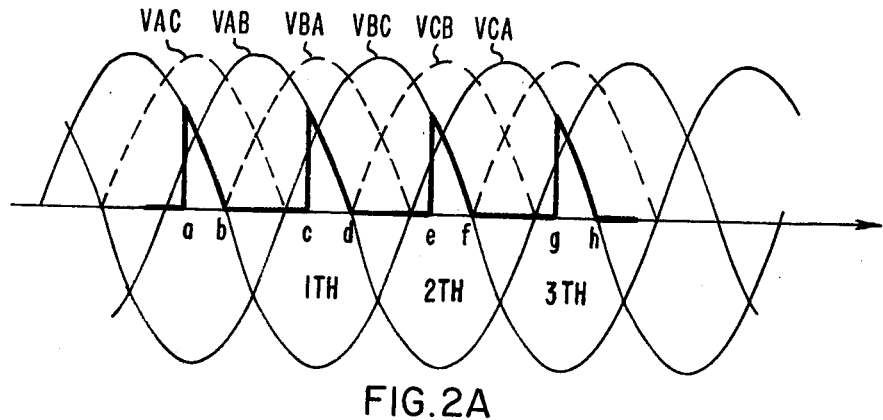
FIGS. 2A and 2B illustrate for two different phase angles of control the voltages involved in the conversion of alternating current into unidirectional current for the arc by the semiconverter of FIG. 1.

If on the secondary windings the potentials $V_{AB}$, $V_{BC}$ and $V_{CA}$ represent the line-to-line potentials for the three phases A, B and C of the three-phase power supply at the primary, the sinusoidal output voltage waves are as shown on FIG. 2A. Voltages $V_{AB}$, $V_{BC}$ and $V_{CA}$ are associated with the anode electrodes of the respective thyristors 1TH, 2TH, 3TH at midpoints L, M and N, respectively. These waves are at 120° from each other. In dotted lines are shown the opposite phase voltage curves $V_{AC}$, $V_{BA}$ and $V_{CB}$ applied to the anodes of respective diodes 1D, 2D and 3D. They are shifted by 60° relative to the preceding curves. Assuming the thyristors are allowed to conduct fully as a diode, e.g. at a delay angle zero, current flows fully, equally and successively through each thyristor and diode alternatively. The output voltage at terminals E and F will be recurring with a unidirectional ripple riding the crest of the two aforementioned sets of curves.

Figure 2B:
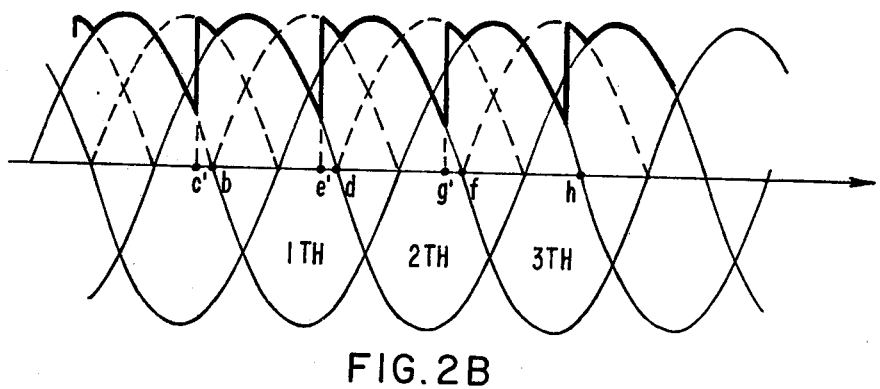

Referring to FIGS. 2A and 2B, crossover points d, f, h correspond to zero conduction, when thyristors 1TH–3TH have been phased back completely. Phasing forward from such initial state indicates conduction. FIG. 2A shows in heavy line the voltage between E and F when the conduction angle is at c, e, g on the abscissa axis for the respective thyristors. Conduction of the thyristors is from c to d, e to f and g to h, respectively. When the voltage reaches the crossover point ($d_1$ for h), the freewheeling diode 4D short-circuits the thyristor, thus preventing a reversal of voltage. Energy accumulated in the reactor IL passes through diode 4D. Therefore, voltage is maintained between E and F along the flat portions de, fg, bc. It appears that the semiconverter of FIG. 1 generates three pulses per cycle as shown in FIG. 2A.

FIG. 2B is similar to FIG. 2A, except that the thyristors have now been phased forward to c' (for 1TH). e' (for 2TH) and g' (for 3TH). The voltage curves for terminals EF are as shown in heavy line, with no flat portion, because the voltages at the diode side are now visible.

Figure 3:
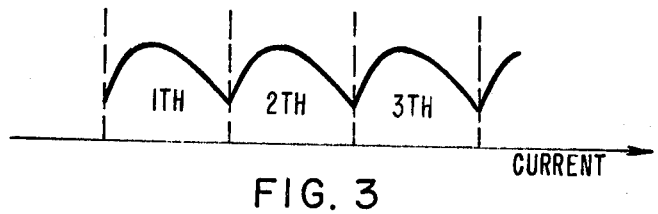
FIG. 3 illustrates current in three-pulse form as can be generated by the semiconverter system of FIG. 1 for the phase angle of the voltage curve of FIG. 2A.

In accordance with the present invention, such semiconverter is coupled through a swinging reactor IL with the torch, or electrode TC, and the workpiece WP of a welding arc. The swinging reactor has been specially designed to be effective for all welding currents in absorbing volt-seconds between terminals EF and giving back energy to the arc, alternately. Referring to FIG. 3, current in the welding arc due to the presence of the smoothing swinging reactor is shown by reference to FIG. 2A. When a thyristor is cut off by the commutation effect of the freewheeling diode 4, energy from reactor IL is being supplied to the welding arc, during the flat portions between current pulses, and therefore contribute to smoothing down the welding current. When the SCR devices 1TH-3TH are being phased forward under control of lines 12, the flat portions are reduced and even disappear as shown by FIG. 2B. More even unidirectional current is supplied to the arc. It thus appears that by controlling the conduction angle of the thyristors, it is possible to progressively increase the welding current. In each instance, reactor IL works as a swinging smoothing reactor. Indeed, at maximum phasing forward a mere ripple exists, which is easily absorbed.

Figure 4:
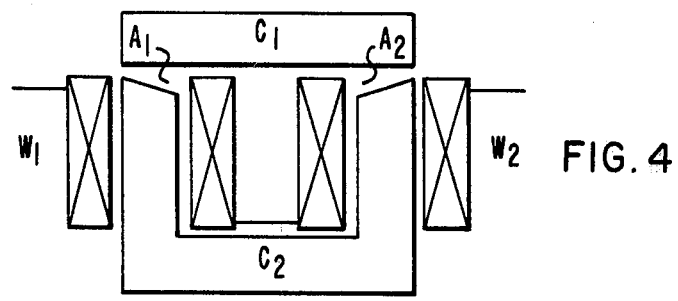
FIG. 4 typically shows a reactor which can be used in the system of FIG. 1.

Referring now to FIG. 4, a reactor is shown as can be used for insertion in the circuit of FIG. 2 at IL.

The reactor includes two coils $W_1$, $W_2$, serially connected, each surrounding a two-legged iron core comprised of two parts $C_1$ and $C_2$ joined by respective opposite air gaps $A_1$, $A_2$. The air gaps are strongly tapered, for instance, from one inch on one side to one tenth of an inch at the opposite side of the iron leg. When an increasing current, such as shown in FIG. 2, is flowing into coils $W_1$, $W_2$, the air gaps, $A_1$ and $A_2$ become more and more saturated from the narrow end toward the open end. However, the air gaps are so designed that for the maximum welding current a finite air gap remains between parts $C_1$ and $C_2$ of the iron core. This ensures that reactor IL will never saturate throughout the operative range of the welding current.

Figure 5:
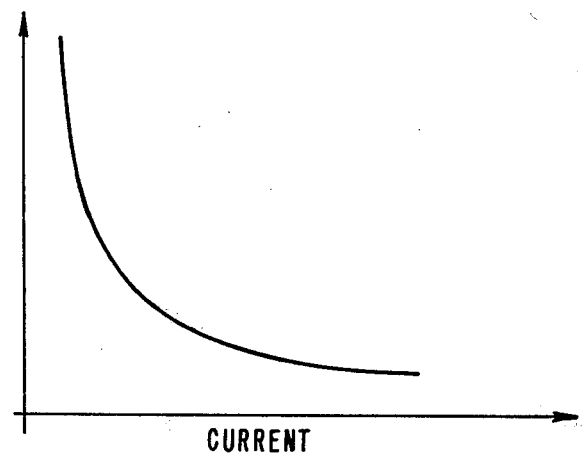
FIG. 5 is a curve representing the inductance as a function of current for the reactor of FIG. 4.

The inductance of reactor IL as a function of the direct current flowing in winding $W_1$ and $W_2$ is represented by the curve of FIG. 5. Thus, an inductor is operatively maintained at all times in circuit between the arc and the semiconverter output terminals and this for all levels of welding current, thereby to maintain an effective smoothing effect. The effect of the inductance IL is variable. At normal welding current with a finite air gap under incomplete saturation, the inductance is designed to smooth out the three-pulse ripple. When welding is initiated, the arc is struck and welding current is being increased. Very discrete pulses (three in succession) are first generated which require strong absorption of energy during pulses. This is achieved through a very large inductance initially as shown by FIG. 5. When the current has increased and a mere ripple has to be smoothed out, the inductance (as shown by FIG. 5) has become just sufficient for that purpose.

It is observed that when the welding operation is being started, usually by touching the workpiece with a wire to strike the arc, a rush of current is caused by this short circuit. Until the welding gap has built up with its own internal resistance, reactor IL has sufficient capability with a large air gap to absorb the voltage and facilitate the transition toward the normal operative point. When the current has stabilized, because of the finite air gap insured by the design of the ever present air gap, the smoothing effect occurs.

It is also observed that because of the freewheeling diode 4D, when the inductance IR is releasing trapped energy toward terminals E and F, the voltage between EF is maintained to zero from the initiation of the commutation, and current in the secondary is kept to zero. Therefore, no reactive power appears at the primary side which could have flown from the load as a reactive power source.

Figure 6A:
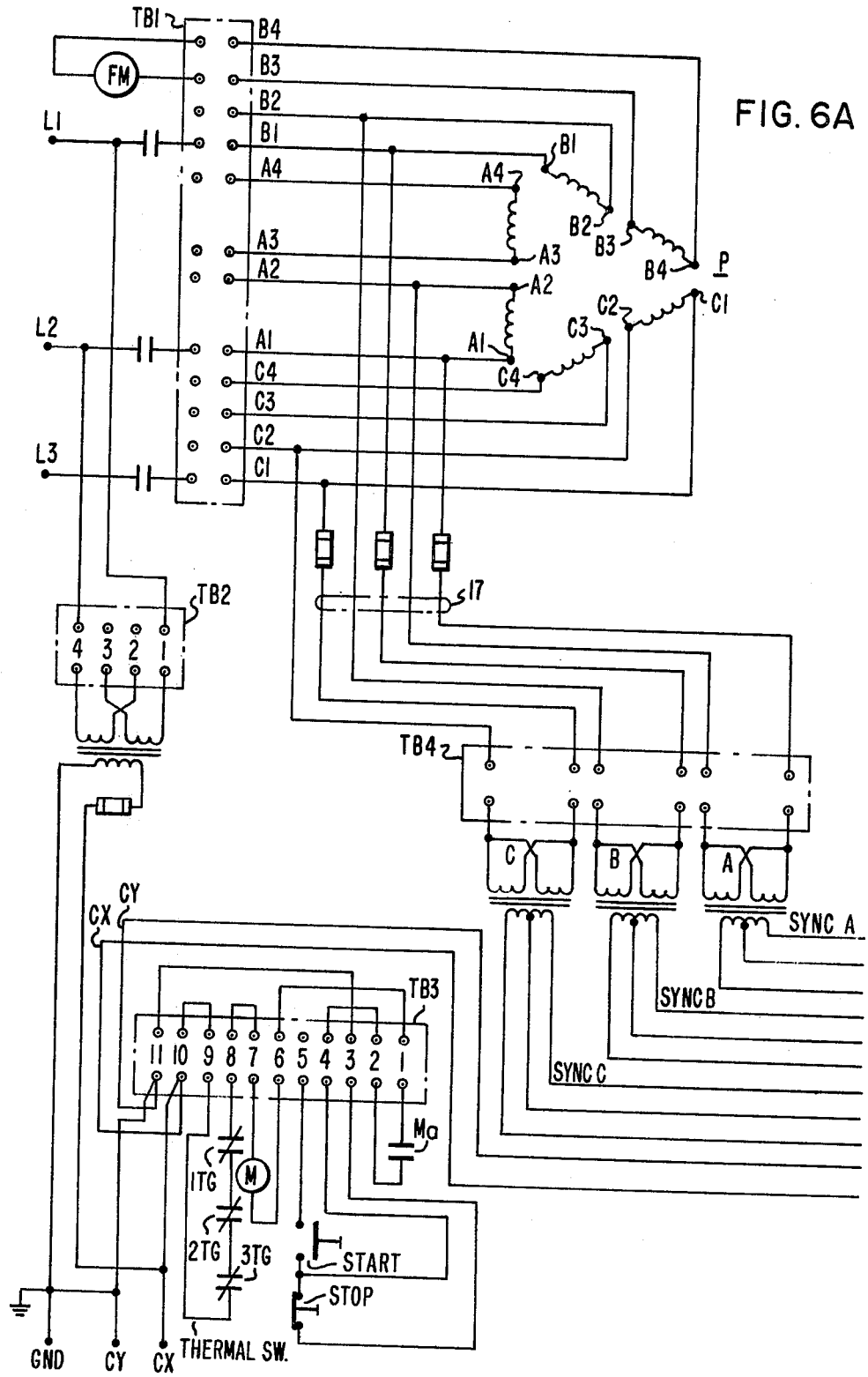
FIGS. 6A and 6B show a practical realization of an arc welder such as schematically illustrated in FIG. 1.
Figure 6B:
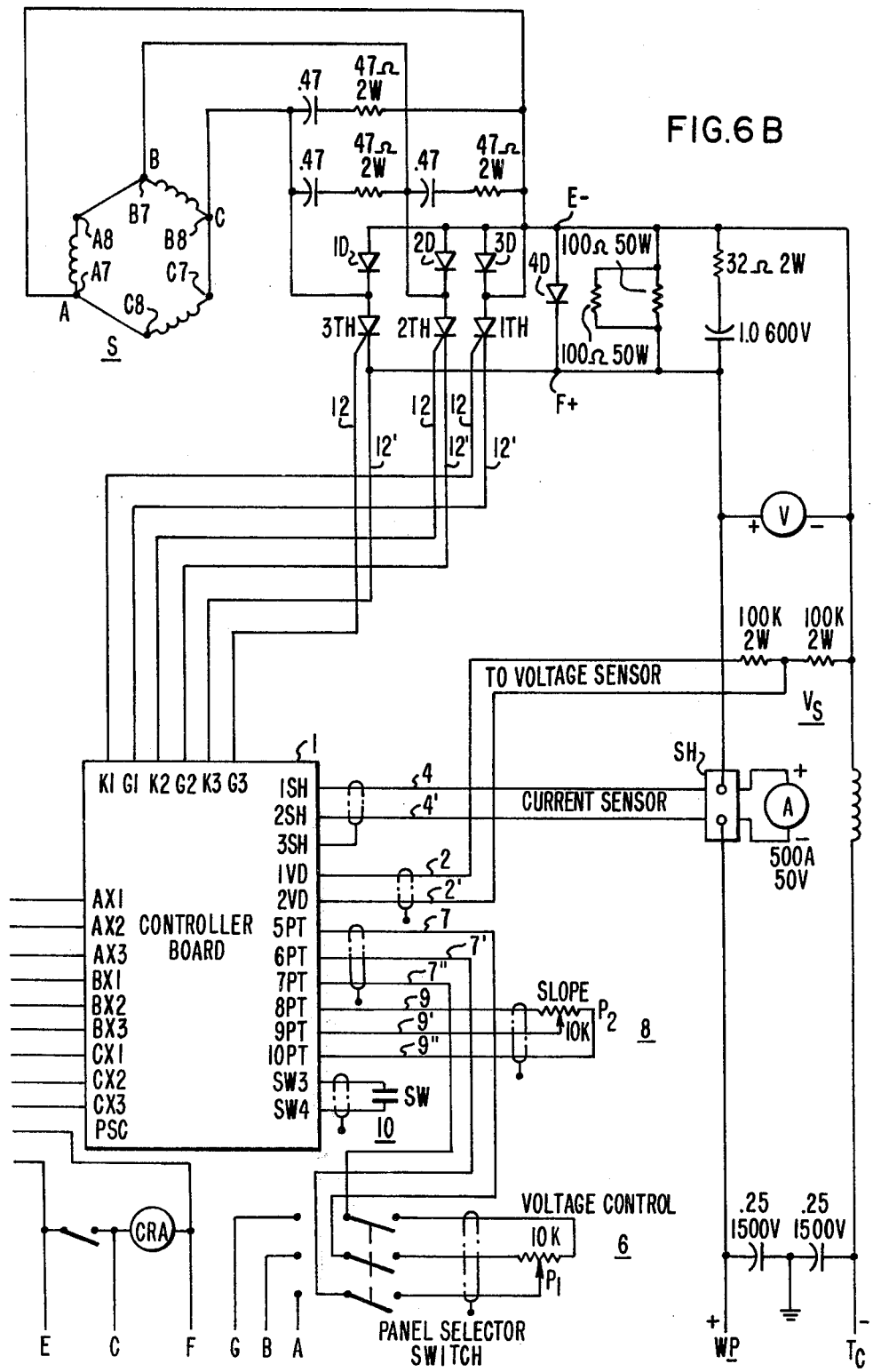

FIGS. 6A, 6B illustrate a direct current power supply adapted for different AC power supplies (AC 3-phase 60 Hz 230 V/460 V) on lines $L_1$, $L_2$, $L_3$ (FIG. 6A). A switch-breaker is provided with contacts M on each line. The main transformer, which may be connected as a delta-delta or star-delta connection between primary windings P (FIG. 6A) and secondary windings S (FIG. 6B), has windings which in order to accommodate the two power supplies can be connected as shown on the following Table:

TABLE

| Jumper | Location |
| --- | --- |
| 230V | 460V |
| $A_1$-$C_4$ | $A_1$-$C_4$ |
| $B_1$-$B_4$ | $B_1$-$A_4$ |
| $C_1$-$B_4$ | $C_1$-$B_4$ |
| $A_2$-$A_3$ | $A_1$-$A_3$ |
| $B_2$-$B_3$ | $A_2$-$A_4$ |
| $C_4$-$C_3$ | $B_1$-$B_3$ |
|  | $B_2$-$B_4$ |
|  | $C_1$-$C_3$ |
|  | $C_2$-$C_4$ |

As shown in FIG. 6A, the jumper locations are shown on a panel TB1, having output point $A_1$-$A_4$, $B_1$-$B_4$, $C_1$-$C_4$ in relation to windings defined by $A_1$-$A_3$, $A_2$-$A_1$, $C_4C_3$, $C_2C_1$, $B_4B_3$ and $B_2B_1$ on the primary. A 115 volt supply is derived from one phase of the AC supply, namely by lines $L_1L_2$, connecting lines 21, 22, panel TB2, transformer $T_2$ and lines 23, 24 at the secondary thereof. Jumper locations 1-2 and 3-4 provide 115 volts from the 230 volt supply, jumpers 2-3 are for the 460 volt supply. The winding ends A, B and C are connected, as shown in FIG. 6B, to midpoints L, M, N of a semiconverter including three pairs of serially connected solid-state devices (1D, 1TH), (2D, 2TH), (3D, 3TH). Thyristors 1TH, 2TH, 3TH are controlled by lines 12, 12' which establish between gate and cathode electrodes a potential which is positive when ignition is permitted, negative for non-conduction. By natural commutation, the thyristor ignites spontaneously if the potential on the anode electrode (e.g. at M, N or L) is larger than on the cathode (e.g. at common point F). Filtering networks are provided between phase lines leading to midpoints L, M, N. Another filtering network is provided on the DC side of the semiconverter (e.g. between B and F).

The freewheeling diode 4D of FIG. 1 is also shown in FIG. 6B between DC terminals E,F. Terminal E, at the negative side, is connected via line 13 to reactor IL, and from then, via line 15, to the arc electrode, or torch TC, assuming welding is conducted with reverse polarity. Similarly, terminal F, at the positive side, is connected to a current shunt SH and, thereafter, via line 16 to the workpiece WP. Between lines 13, 14 the voltage sensor VS consists of two resistors in series. The sensed voltage is taken between line 14 and the midpoint J. Lines 2, 2' convey the voltage signal V to the thyristor control circuit 1. As shown in FIG. 6B, the thyristor control circuit is in the form of a controller board having input and output connections. Thus, lines 2, 2' are connected to connecting points 1VD and 2VD on the board.

Figure 13A:
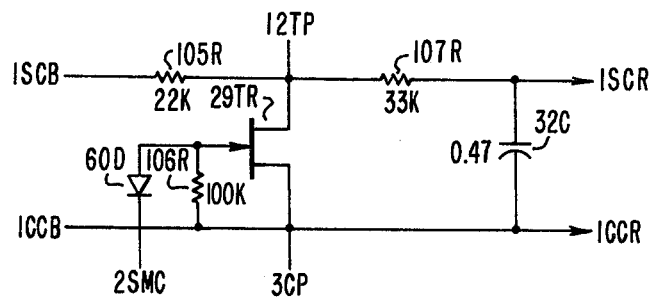
FIGS. 13A, 13B show the current control section including current reference select switch and current controller.
Figure 13B:
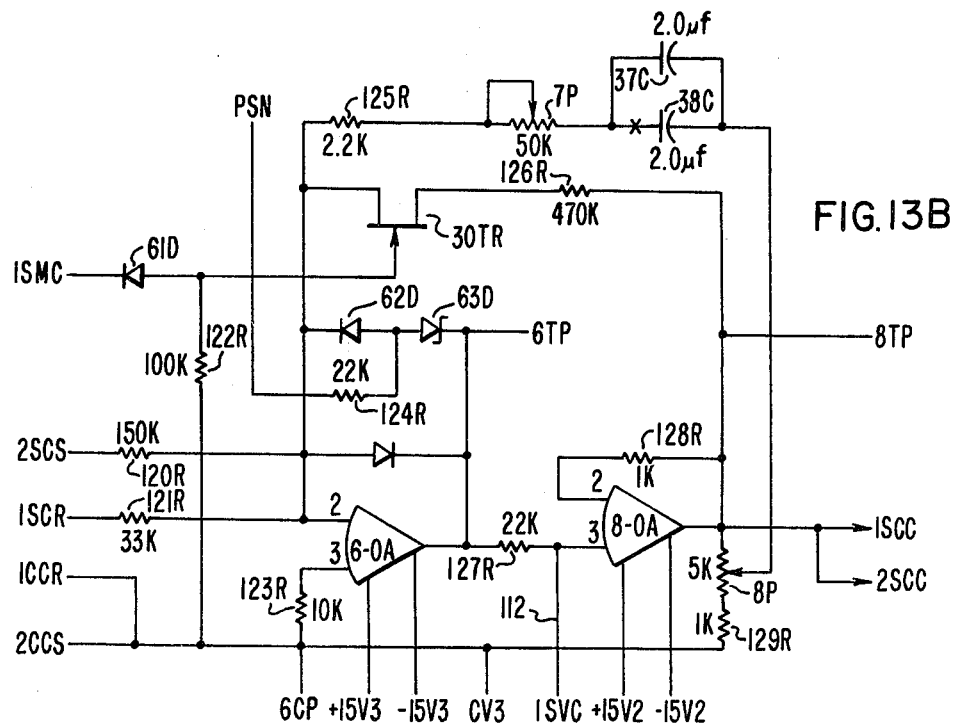

In the same manner, lines 4, 4' from the current sensor SH belong to a cable connected to points 1SH, 2SH, with the cable ground at point 3SH on the board. 1SH and 2SH are the input terminals to the current sensor (FIG. 10) generating a sensed current signal (1SCS; 2SCS) applied as input to the start detector of FIG. 11 and as feedback current to the current controller of FIG. 13B. The voltage reference (FIG. 14C) is adjusted by potentiometer 6P; the current controller (FIG. 13B) by potentiometers 7P and 8P. Voltage control 6 is connected via lines 7, 7" to points 5PT, 7PT on the board. Points $K_1G_1$, $K_2G_2$, $K_3G$ are fixed on the board and provide outputs for lines 12, 12' to the respective thyristors.

The power supply for the printed circuit board components is derived from windings $A_1A_2$, $B_1B_2$, $C_1C_2$ at the primary P of transformer T (FIG. 6A), and is fed via lines 17 with appropriate voltage reduction to three sets of three input terminals $(AX_1, AX_2, AX_3)$, $(BX_1, BX_2, BX_3)$ and $(CX_1, CX_2, CX_3)$ on the board (FIG. 7B).

Owing to the particular nature of the load, operation and control of the semiconverter system just described require special considerations. Assuming that the semiconverter system is initially part of a constant potential direct current arc welder, and that the welding arc is struck between the workpiece WP and an automatically fed consummable electrode, or wire, in the welding torch TC, the usual welding operation is conducted as follows:

First, the wire is brought into contact with the workpiece. At that moment, the voltage becomes zero between TC and WP and a rush of current flows into the wire. Such short circuit causes the wire to be melted and a gap to be established between TC and WP. While under the air gap voltage welding current builds up as desired, wire is fed at a corresponding rate.

Figure 7:
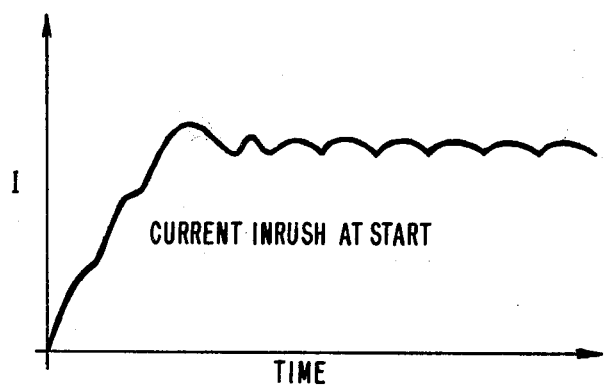
FIG. 7 represents the current buildup in the welding arc under the influence of a reactor such as the one shown in FIG. 4.

When the current inrush takes place at the zero voltage initial condition, due to the very large initial reactance, reactor IL absorbs the volt-second effect until the welding current level $I_W$ is established through the arc gap, as shown in FIG. 7. Once the current determined by the phase angle of thyristors 1TH-3TH is established, reactor IL with a finite air gap absorbs the current variations due to the pulsated nature of the semiconverter output voltage.

While the inductance absorbs only the volt/second effect, the DC voltage at the air gap and through the welding circuit is also found between terminals E and F at the output of the semiconverter. Between E and F a fraction of such DC voltage is sensed and used by a voltage sensor circuit to derive a feedback input to be compared to a reference voltage. As seen hereafter, the voltage sensor circuit (FIG. 13A) maintains the phase angle of the thyristors so that, when starting welding, current is automatically building up at a level sufficient to maintain the air gap voltage constant. Then, the start detector of FIG. 11, which is a bilateral switch, detects a current at a critical level in the arc, and switches to such state that the voltage controller of FIG. 14B is rendered inoperative. At the same moment, a time delay TD (FIG. 12) is established after which the current controller (FIG. 13B) becomes effective to maintain constant current in relation to a current reference, also established after the time delay TD. Moreover, a bias reference is provided (FIG. 15) such that whenever the arc voltage becomes too low for proper heat transfer to the weld, it is added to the current reference, thereby to generate through the current controller (FIG. 13B) a boost current on the arc. The latter is automatically and progressively reduced when the arc voltage increases.

Figure 8:
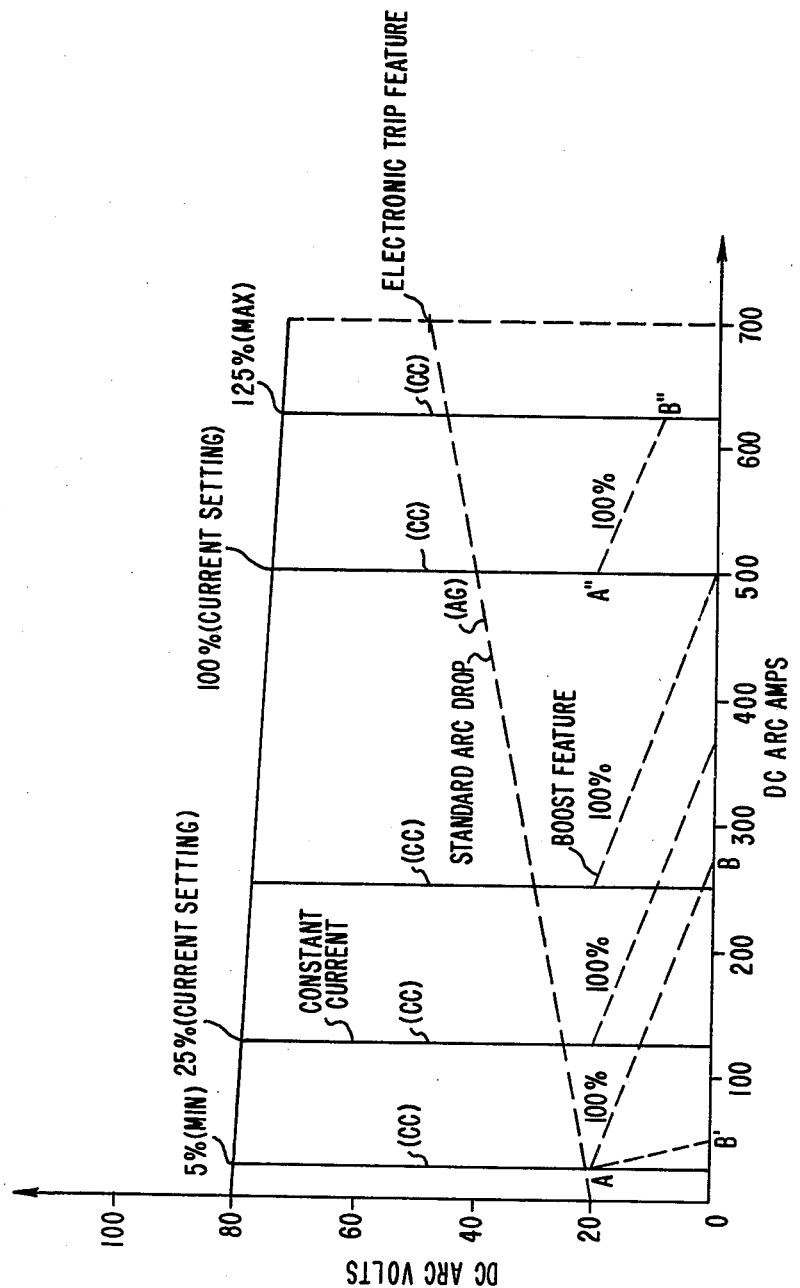
FIG. 8 shows the voltage v. current curves for different constant current welding operative levels and the available boost currents for respective such welding operative levels.

Curves (CV) in FIG. 8 show typical constant current welding characteristics.

Typically on FIG. 8, along a given constant potential characteristic (e.g. a somewhat drooping line) (CP) several constant current characteristics (CC) are shown for respectively 5%, 25%, 50%, 100% and 125% operative current. Also, FIG. 8 indicates the arc gap voltage drop (AG) by a straight line extending, typically, from 20 volts for zero current up to 55 volts for a maximum current of 700 amperes.

The invention provides, as explained hereafter, a current boosting feature to help establish the normal welding operation whenever the arc voltage becomes too low (below 20 volts on FIG. 8). As shown on line AB associated with the 5% setting current characteristic, at 100% boost the current developed through the arc by the current booster circuit is about 275 amperes, which current is progressively reduced along AB until it reaches the operative level of 5% at A. If the boost is reduced to 5% the characteristic typically is AB', and an operative point A is reached from an initial current at B' of 50 amperes. Other similar boost characteristics are shown on FIG. 8 for the other settings of the current characteristic. Electronic tripping in the arc welder prevents excessive current. Thus, as shown in FIG. 8 beyond 125%, the circuit trips. The boost response line A"B" relative to 100% current setting, shows the cutting point at B".

From an initial operative current of 20 amperes at A, for the 5% setting characteristic, the welding arc under operation moves along the vertical line without exceeding the 80 volt constant potential level, maintained by the voltage controller setting, and without exceeding, or going under, the 20 ampere current level by the effect of current control, as explained hereinafter. It thus appears that a constant current arc welder is, in fact, a variable potential machine with a constant potential limit, which is current controlled, but that can be operated at different current levels.

The curves of FIG. 8 represent steady states. The welding operative points may be chosen to be at any particular point on such a curve. In the final analysis it is the phase angle imposed on thyristors 1TH-3TH from lines 12 by the gating pulse generator which determines the welding current for a given arc gap between TC and WP, or between E and F at the output of the semiconverter system, for a given feed rate of the welding wire. However, in the course of a welding operation, the operator may change the current and voltage references or the welding mode for various reasons. He could stop the operation and restart it at will, thus changing drastically the voltage and current conditions at the output of the semiconverter system. It is also possible that an overcurrent condition may unexpectedly appear requiring interruption of the welding operation. Under such situations it is desirable that the operator can readily find back the operative point on the chosen characteristic as it had been left. Unrealistic gate angles are proscribed either because they are unacceptable, or because they might create hunting and the system will be unable to reach from the chosen welding condition. It is a matter of safety, of convenience and of savings altogether.

Figure 9:
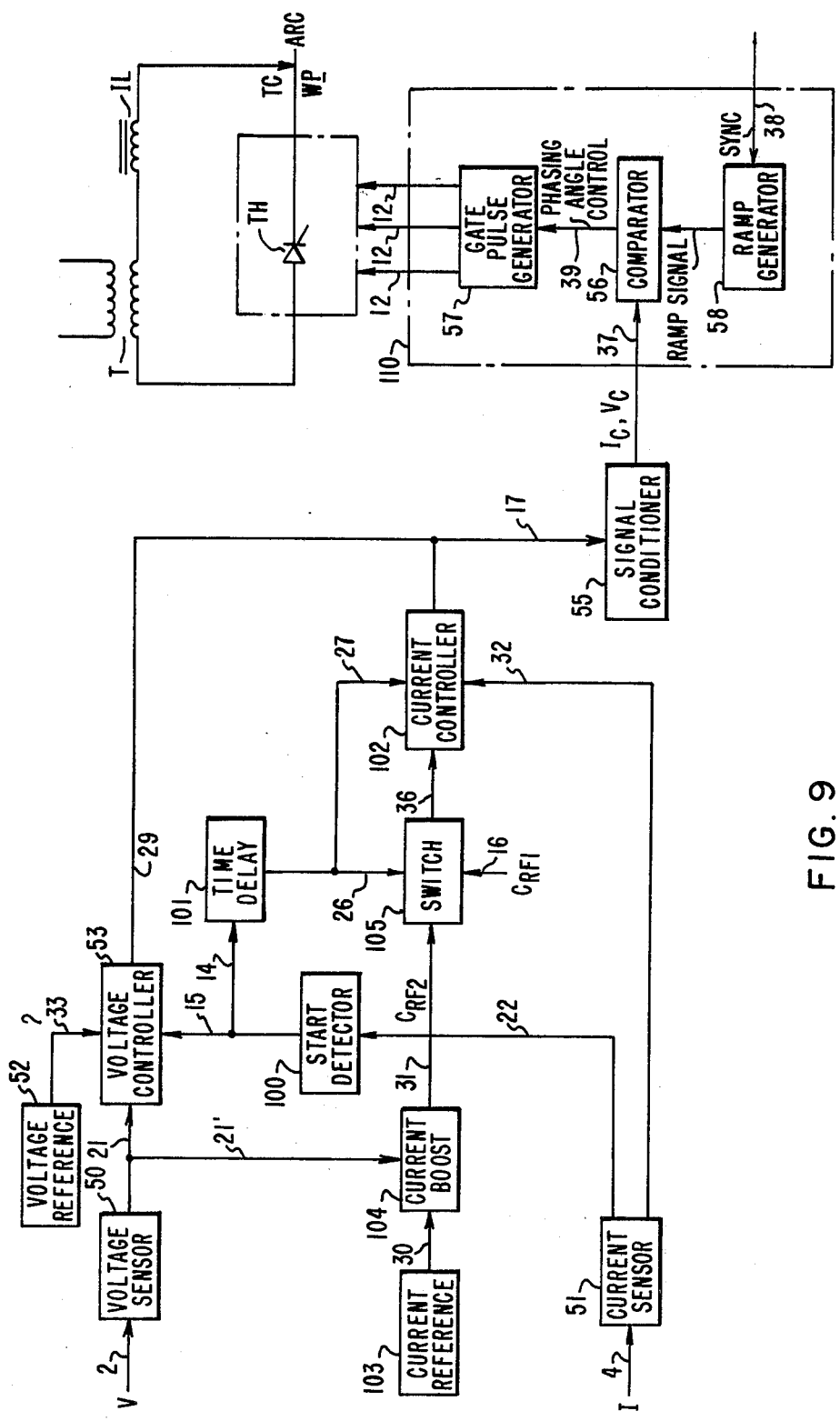
FIG. 9 is a diagrammatic representation of the control circuit associated with the constant current arc welder according to the present invention.

Referring to FIG. 9, a diagrammatic representation is given of the control system 1 which is associated with the semiconverter system of FIGS. 1 and 6A, 6B.

The value of voltage V sensed between terminals E and F is inputted by lines 2 into a voltage sensor circuit 50. The sensed value I derived from current sensor SH is applied by line 4 as input to a current sensor circuit 51.

A voltage reference circuit 52 is associated with the voltage sensor circuit 50 to provide on respective lines 33 and 21 input signals to a voltage controller 53. As in copending case Ser. No. 891,986, filed Mar. 31, 1978, now abandoned, relative to a constant potential arc welder, feedback voltage control is provided from voltage controller 53 via line 29, signal conditioner circuit 55, line 37, thyristor gating module 110 (including comparator 56, ramp generator 58 and gate pulse generator 57 on FIG. 9), lines 12 and thyristor $TH_1$, $TH_2$, $TH_3$.

Similarly for feedback current control, the arc welder according to the present invention includes a current controller 102 supplied with a reference signal on line 36 originating in line 31, or line 16, at the input of a switch 105 controlled from line 26 to supply one of two current references $C_{RF1}$ (on line 16) and $C_{RF2}$ (on line 31). A current reference circuit 103 provides the current reference on line 30, but this signal may be modified by a current boost circuit 104 wherever this is dictated by the voltage sensor 50, via line 21', as shall be seen hereinafter. Thus $C_{RF2}$ on line 31 may be the current reference 103, or a modification thereof in accordance with current boost circuit 104. Like voltage controller 53, current controller 102 provides feedback control via line 17, signal conditioner 55, line 37, thyristor gating module 110, line 12 and thyristors $TH_1$, $TH_2$, $TH_3$.

Control by voltage controller 53 (in the voltage control mode) or by current controller 102 (in the current control mode) depends upon the state of logic signals on lines 14 and 15 from a start detector circuit 100. Initially the operator touches the workpiece WP with the weld electrode or torch TC while under voltage control, namely while voltage controller 53 establishes the proper phase angle for the thyristors, and therefore an initial voltage between electrode and workpiece. Current rushes at the welding point and while the electrode is being withdrawn from the workpiece an arc is struck with current inrush across the arc gap.

Most of the current rush is absorbed by the reactor IL, but still current has a tendency to raise very quickly in the arc. As soon as current is detected in the arc, current sensor 51 causes, by line 22, start detector 100 (which is a threshold detector) to change state. As a result, from line 15, the voltage controller is disconnected and line 29 no longer controls the signal conditioner 55. Also on line 14, the activation state is transmitted via a time delay circuit 101 to both the switch 105 (via line 26) and the current controller 102 (via line 27). Under the circumstance, after a predetermined time delay (TD) the current reference applied to current controller 102, which initially was $C_{RF1}$ (line 16), becomes $C_{RF2}$ (line 31) and current controller (in the current control mode) establishes by line 17 to the signal conditioner circuit 55 a constant current operative mode with $C_{RF2}$ as current reference. It appears that once the voltage control signal via line 29 has been retrieved by the start detector 100 command on line 15, the current controller becomes effective in controlling the welding arc under current feedback from line 32. However, at that moment the initial current reference is $C_{RF1}$, which is low or practically zero, thus effective to keep the arc current down, and therefore to prevent a sudden and extreme rise of current in the arc. This is the case at least as long as the time delay of circuit 101 lasts. When this occurs, the current reference $C_{RF2}$ is applied, and current controller 102 establishes proper control of the thyristors (TH) so as to maintain constant current under the current reference $C_{RF2}$ from circuit 103.

The object of the interposed current boost circuit 104 is to further change the reference $C_{RF2}$ in order to automatically maintain sufficient current through the arc whenever in the welding process the arc voltage would fall too low by the operator's handling of the electrode. Whenever the operative point falls substantially under the (V,I) characteristic of the arc (20 volts on FIG. 8) the transfer of heat to the welding seam becomes too low and the temperature of the weld would sink. Current boost, as generally known, is an increased current supplied to the arc under such circumstances in order to keep the heat level. Current boost characteristics such as AB are shown in FIG. 8.

Figure 12:
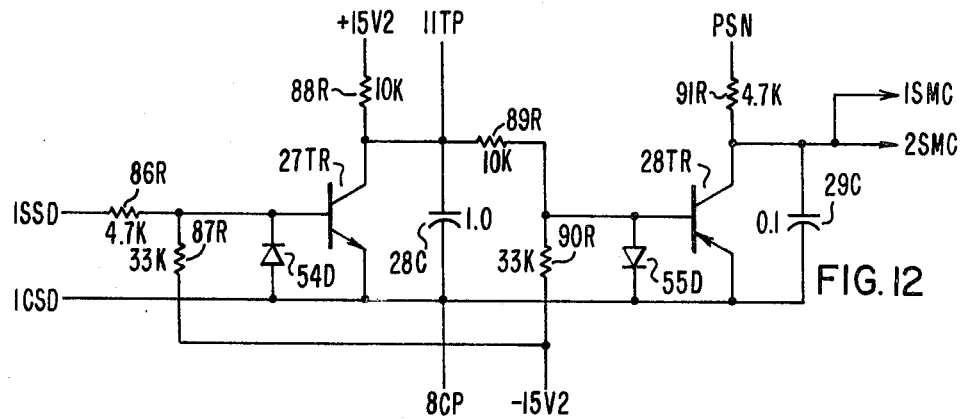
FIG. 12 shows the true delay circuit.
Figure 14C:
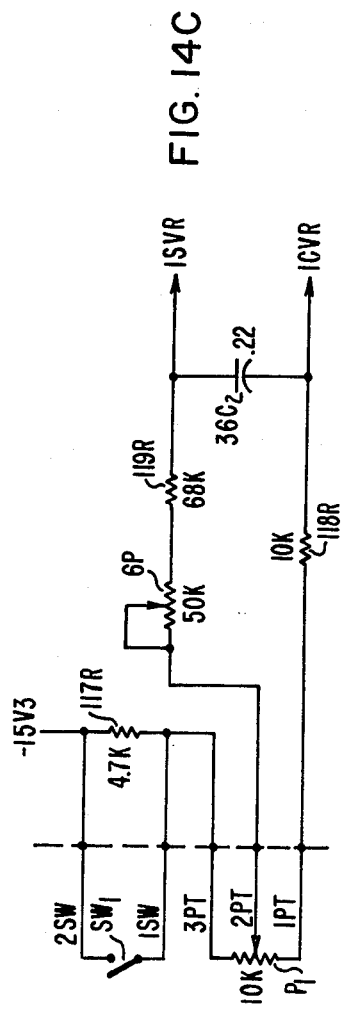
Figure 15:
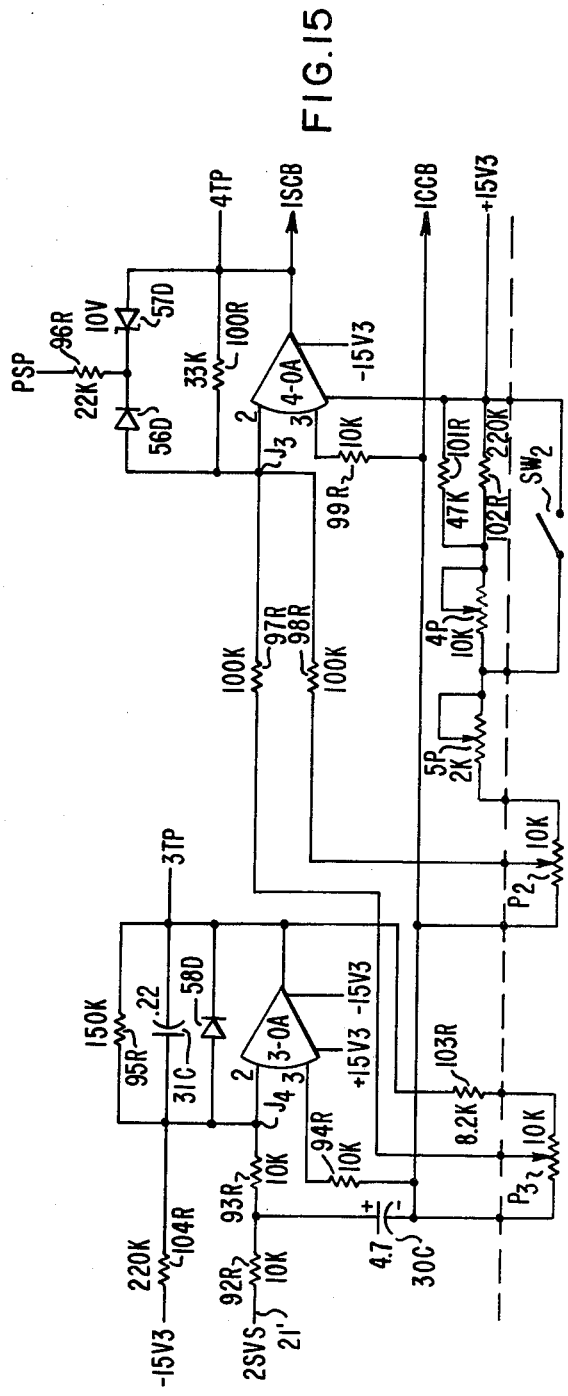
FIG. 15 is the boost controller including the current reference panel.
Figure 16:
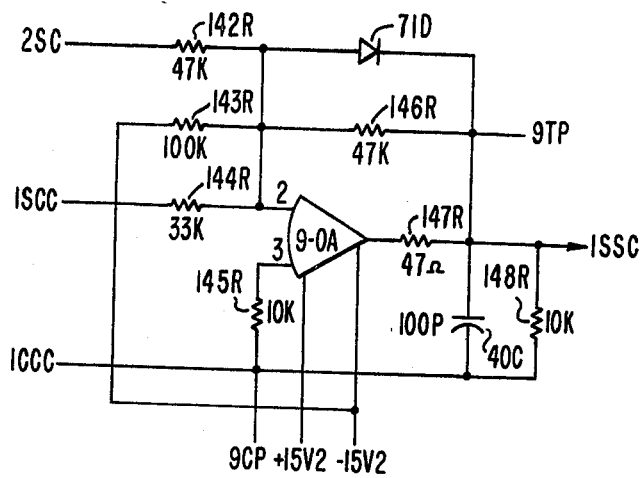
FIG. 16 is the signal conditioner circuit.

The various blocks of FIG. 9 will now be described specifically by reference to FIG. 10 (current sensor 51); FIG. 11 (start detector 101); FIG. 12 (time delay circuit 101); FIG. 13A (switch 105); FIG. 13B (current controller 102); FIG. 14A (voltage sensor 50); FIG. 14B (voltage controller 53); FIG. 14C (voltage reference 52); FIG. 15 (current reference panel 103 and current boost 104) and FIG. 16 (signal conditioner 55).

Referring to FIG. 10, the current sensor in a conventional way includes an operational amplifier 1-0A mounted as a differential between the current shunt terminals 2SH, 1SH, with the usual filtering network across the inverting and the non-inverting inputs. A feedback signal 1SCS, 2SCS is outputted relative to the common mode line at 1CCS.

Referring to FIG. 11 the start detector is shown as a threshold comparator. A reference potential is applied at $J_1$ to the inverting input (2) of an operational amplifier 2-0A. The reference potential is negative and established, from the $-15$ V potential, at the junction of a resistor 80R (33K) and the cathode of a diode 48D the anode of which is connected to the common lead, or ground. Thus a voltage of $-0.6$ volts is normally established by $J_1$ through resistor 79R to the input of 2-0A, e.g. when no current signal is derived on line 2SCS from the current sensor to the same input (via resistors 76R and 78R) each 1.5K). Under such critical conditions, the output (1SSD, 2SSD) exhibits a positive output of $+8$ volts, considering the negative feedback via line 12 to the non-inverting input (3) of 2-0A derived from the junction point of a resistor divider (82R, 83R) connected across the output of 2-0A. The reference potential is such that when a current signal representing 10 amperes through the arc is derived at 1SCS, 2SCS of the current sensor, the comparator switches at the output from $+8$ volts to $-8$ volts. Capacitor 27C at the output and resistors 82R, 83R, of the divider introduce a time delay, e.g. an hysteresis in the switching knee of the response characteristic, so that switching back and forth do not occur at the same level of current on 1SCS, 2SCS from the current sensor. FIG. 11 is a conventional circuit and is readily understood. For instance, Zener diode 51D is mounted in the diagonal of a bridge comprising diodes 49D, 50D, 52D and 53D thereby to constitute a limiter in the feedback loop between the output of 2-0A and the inverting input (2).

When the arc is struck by the operator and the current inrush is detected by the circuit of FIG. 11, the output 1SSD, 2SSD shifts symmetrically from $+8$ volts to −8 volts. In this second state, while current in the arc increases, above 10 amperes as a threshold, toward 500 amperes or more, the start detector by 1SSD, 2SSD on the one hand inhibits, via line 15, the operation of voltage controller 53 and, on the other hand, enables the operation of switch 105 via line 14 and time delay 101.

Referring to FIG. 12, the time delay circuit 101 is shown with a time basis comprised of resistor 88R (10K) and capacitor (28C) charged from a +15 volts source. Normally, capacitor 28C is short-circuited by a transistor 27TR in its conductive state, namely when the −8 volts from the start detector causes a negative potential to be applied to the base of the transistor. When transistor 27TR is ON, a second transistor 28TR having a negative bias on the base is also ON. When transistor 28TR is ON, the output (1SMC, 2SMC) from its collector electrode is low, which is the control signal initially applied on lines 26, 27 to the switch 105 and the current controller 102, respectively. As soon as start detector switches to +8 volts, transistor 27TR turns OFF. However, due to the time delay TD introduced by capacitor 28C, the negative potential on the base of transistor 28TR is not immediately overcome by the 15 volts applied and distributed by resistors 88R, 89R and 55D. After a time delay (TD), 28TR is turned OFF and the output 1SMC, 2SMC goes high (PSN via line 91R is applied).

Referring to FIG. 13A, switch 105 is shown including an FET device 29TR which, initially, is in the low impedance state so that the outputted current reference (1SCR) is held low ($C_{RF1}$) between the junction of resistors 105R (22K) and 107R (33K) and the common lead or ground (1CCB-1CCR). The initially negative signal 2SMC (−8 volts) from the time delay is applied via a forward bias diode 60D to the base of the FET device 29TR. Whenever 2SMC goes high (+8 volts), diode 60D becomes non-conductive and device 29TR switches to the high impedance state. As a result, 1SCB which is the signal derived from current boost circuit 104, becomes the current reference, $C_{RF2}$ (1SCR) at the output via the resistor 107R. Thus, depending upon whether 2SMC is in the low or high state, the current reference $C_{RF1}$, or the current reference $C_{RF2}$, is being passed to the output of circuit 105 and on line 36 to current controller 102. Capacitor 23C (47) and resistor 107R (33K) introduce a time constant (TD) before $C_{RF2}$ actually replaces $C_{RF1}$.

Referring to FIG. 14A, the arc voltage representative signal V on line 2 (FIG. 9) is received between terminals 2VD, 1VD of voltage sensor 50. The voltage sensor includes an operational amplifier 5-0A connected as a differential between the inverting input (2) and the non-inverting input (3). The outputted signal is between 2SVS, 1SVS and the common lead or ground 1CVS. The sensed voltage becomes the voltage feedback signal on line 21 to the voltage controller 52 (FIG. 9).

Referring to FIG. 14B the voltage controller includes an operational amplifier 7-0A mounted as a differential and receiving at its inverting input (2) both the voltage feedback signal (1SVS) from the voltage sensor and the voltage reference signal (1SVR) from the voltage reference panel 52 (on line 33, in FIG. 9). The outputted signal representing the error between 1SVS and 1SVR is passed at the output and the feedback control signal (1SVC) is carried across an FET switch 32TR onto the inverting input of another operational amplifier 8-0A which is found within the current controller section in FIG. 13B.

As generally known, 7-0A includes a limiter between output and input, which is provided by Zener diode 68D and diodes 66D, 67D. The voltage controller formed by 7-0A and 8-0A in the normal operation introduces the proportional and integral (P+I) functions. Thus, voltage controller 53 is to be read with operational amplifier 7-0A of FIG. 14B concurrently with operational amplifier 8-0A of FIG. 13B. The output of 7-0A (FIG. 14B) is connected to the non-inverting input of operational amplifier 8-0A (FIG. 13B). The output of 8-0A is fed back (2SCC) to potentiometer 9P and the time basis network formed of parallel resistor 137R (680K) and capacitor 39C (0.022).

Similarly, referring to FIG. 13B, the current controller 60 comprises an operational amplifier 6-0A and an operational amplifier 8-0A. The current reference (line 36, FIG. 9) is applied (1SCR) from the switch circuit of FIG. 13A (105 in FIG. 9). Except for a feedback loop including resistor 126R (470K) and FET device 30TR in the conducting state, the combination of 6-0A and 8-0A constitutes a proportional plus integral (P−I) function for the inputted signal on the inverting input (2) of operational amplifier 6-0A. A selected amount of the output of 8-0A between 1SCC, 2SCC and the common lead or ground 1CCR is derived from potentiometer 8P and fed back negatively to the active input of 6-0A, via parallel capacitors 37C, 38C, potentiometer 7P and resistor 125R so as to establish a predetermined and selectable dynamic characteristic in the current controller. However, due to the presence of the FET device 30TR in the direct feedback loop between 8-0A and 6-0A, the overall current controller is maintained in the negative saturation level for any magnitude of inputted signal. The current feedback control signal 1SCC, 2SCC is generated in relation to the inputted error between the current reference 1SCR (line 36 from switch 105) and the feedback current signal 2SCS from the current sensor 51 (FIG. 10).

Referring again to the voltage controller, the combination of operational amplifier 7-0A (FIG. 14B) and operational amplifier 8-0A (FIG. 13B) is very similar, as has been seen earlier. The dynamic characteristic of voltage control is adjusted by potentiometer 9P (see FIG. 8 for the voltage characteristic) and the voltage reference setting (see voltage rference panel on FIG. 14C), while the constant current characteristic is selected by adjustment of potentiometers 7P, 8P, as well as the current reference setting (see current reference panel on FIG. 15).

Referring to FIG. 14C, the voltage control panel of the welding operator is shown with potentiometers $P_1$ and 6P providing voltage adjustment in tapping between 1SVR and 1CVR a fraction of a −15 volts source. Switch $SW_1$ shorts out the series resistor 117R (4.7K) whenever the operator wants to shift from the low to high range of voltage adjustments.

Referring to FIG. 15 the current reference circuit 103 and current boost circuit 104 are shown together. The operator's panel includes a potentiometer $P_2$ (besides potentiometer 5P for low range adjustment and 4P for high range adjustment when the range select switch $SW_2$ is open) to adjust the current reference, and a potentiometer $P_3$ for current boost adjustment.

A portion of the output of operational amplifier 3-0A (by $P_3$ and resistor 97R to junction $J_3$ at the inverting input (2) of operational amplifier 4-0A) is added to a portion derived at P$_2$ from a +15 volts source (via resistor 98R, 5P and/or 4P and resistors 101R, 102R). In other words, to the current reference at J$_3$ from potentiometer P$_2$ is added a boost reference current from operational amplifier 3-0A.

Such boost signal causes the outputting at the output of 4-0A of an actual current reference 1SCB which is augmented by the amount of boost from operational amplifier 3-0A. At junction J$_4$ to the inverting input of operational amplifier 3-0A a bias voltage is applied from a −15 volt potential via resistor 104R (220K). Also at junction J$_4$ is applied via resistors 92R, 93R (each 10K) a signal representing the feedback voltage (2SVS) from voltage sensor circuit 50 via line 21' (FIG. 9 and FIG. 14A). However, a feedback loop including diode 58D is provided as a limiter so that whenever the voltage 2SVS on line 21' exceeds the bias at J$_4$ from the −15 volts source, the output of 3-0A becomes cut-off. The operation is as follows: Whenever the arc voltage (FIG. 8) represented by the signal on line 21' is reduce below a certain level (in the example of FIG. 8 it is 20 volts), the voltage from the bias source at junction J$_4$ becomes predominant, thus causing at the output of 3-0A a current boost of increased value as the voltage is reduced in the arc below such level (20 volts). Conversely, as the arc voltage at the hand of the operator is building up, the effect of the bias at junction J$_4$ is progressively reduced, and so is the sum of boost plus current reference at junction J$_3$ of 4-0A. Such reduction proceeds until the critical level of arc voltage for which boost current is no longer necessary (20 volts) is reached, namely, equality at the J$_4$ junction. At that moment the current reference remains alone at junction J$_3$. The welding current is, from there on, controlled by the current controller in relation to the current reference at junction J$_3$, only.

Potentiometer P$_3$ adjusts the amount of boost current derived from 3-0A. Potentiometer P$_2$ adjusts the amount of current reference (with or without boost) derived at the output of 4-0A.

The current reference (with or without boost) is applied at the inverting input of 6-0A in the current controller (FIG. 13B) which, in conjunction with 8-0A, provides signal 1SCC. The latter through the signal conditioner 55 (FIG. 16) becomes the feedback current control signal 1SSC applied via line 37 to the thyristor gating module 110 controlling via lines 12 the phasing angle of thyristors TH$_1$, TH$_2$, TH$_3$.

Signal conditioner 55 includes an operational amplifier 9-0A. Its purpose is to convert signal 1SCC into a proper signal to be compared with the ramp signal from ramp generator 58 which is the time dependent reference to the electrical angles of the voltage applied to the "next" thyristor to be ignited. When the threshold defined by signal 1SSC on line 37 is reached, triggering occurs at the required fire angle by a gating pulse from gating pulse generator 57, as outputted on lines 12.

In the voltage control mode, initially before the arc is struck, phasing of the thyristors by line 37 maintains an arc voltage desired in accordance with the setting on the operator's panel for the voltage reference (FIG. 14C). In the current control mode, phasing of the thyristor by line 37 maintains the desired arc current in accordance with the setting on the operator's panel for the current reference (FIG. 15), with or without current boost, depending upon the effect of the voltage sensor via line 21' on the bias voltage at the input of operational amplifier 3-0A.

Mode transfer from voltage control to current control will now be explained by reference to FIG. 14B (voltage controller); FIG. 11 (start detector); FIG. 12 (time delay); FIG. 13A (switch circuit) and FIG. 13B (current controller).

Initially the arc welder according to the invention is in the voltage control mode, namely the electrode at the operator's hand is kept under proper voltage with respect to the workpiece. There may be a cold start or a hot start. When the electrode touches the workpiece, current builds up which is absorbed a great deal by reactor IL. Referring to FIG. 7, the time origin shows the initial voltage $v_i$ applied to the electrode with zero current on the ordinate. The current inrush is shown from time $t_0$ to $t_1$ when the critical current is detected from line 22 by start detector 100 (FIG. 11C). Up to that time voltage $v_i$ is maintained by voltage controller 53 (FIG. 14B). Start detector first responds to the detected current at the level shown at A for $t_1$ by disabling the voltage controller (via line 15) namely by disconnecting the input level from operational amplifier 7-0A (FIG. 14B) to operational amplifier 8-0A (FIG. 13B) due to FET device 32TR being controlled from 2SSD by transistor 31TR and transistor 33TR with the PSN potential on the collector of 33TR and on the cathode of diode 70D in the base circuit of device 32TR.

Figure 17:
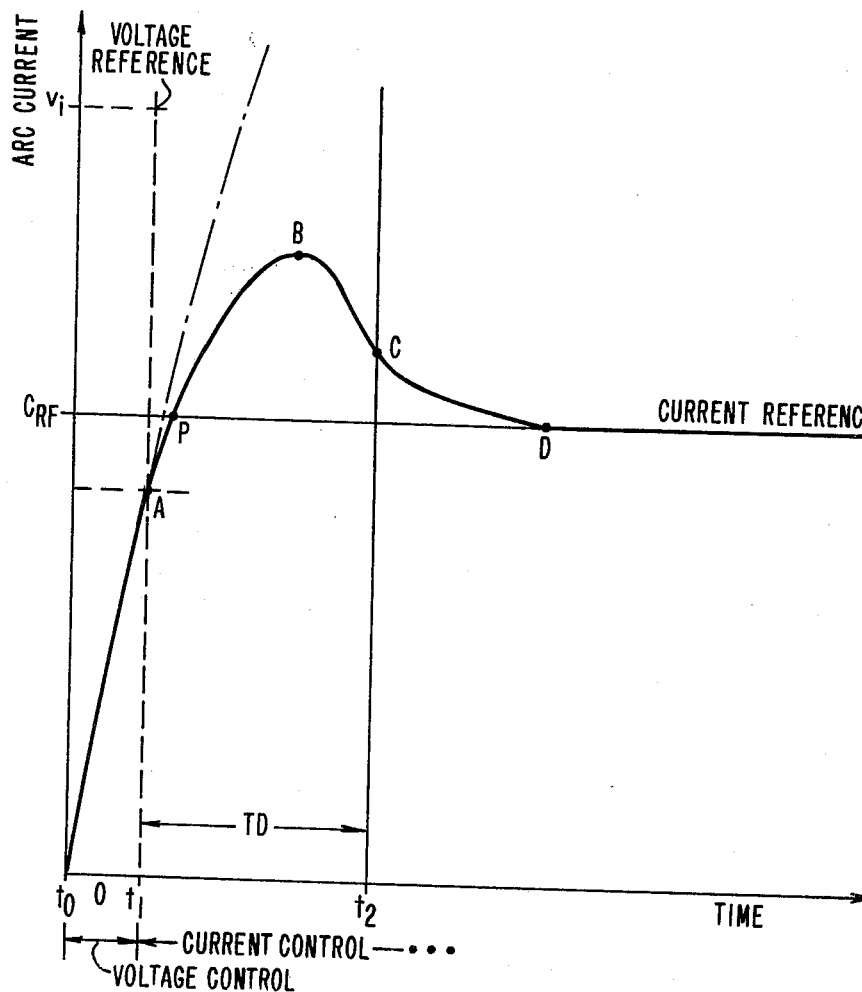
FIG. 17 shows curves explaining the overall arc welder operation.

Referring to FIG. 13B, before instant $t_1$, while still in the voltage control mode, the input on line 112 to the non-inverting pin of 8-0A (from the first operational amplifier 7-0A of the voltage controller) is effective to control 8-0A while the output from 6-0A (in the current controller) due to resistor 127R (22K) has no effect on 8-0A. At instant $t_1$, when line 112 is disconnected by the start detector, the current in the arc would still have a tendency to overshoot upward, as shown from A in dotted line on FIG. 17. However, in accordance with the present invention several measures will tend from instant $t_1$ to force the current build-up to follow the path A,B,C,D toward the desired constant current level at D. From instant $t_1$ to instant $t_2$ the time delay (TD) imposed by circuit 101 prevents actuation of the switch 105 (FET device 29TR in FIG. 13A) and interruption of the negative feedback loop from 8-0A to 6-0A (by FET device 30TR in FIG. 13B). Therefore, the current reference is $C_{RF1}$ during the interval ($t_1-t_2$), e.g. substantially zero (1CCB in FIG. 13A). As a result, the increase in feedback current 2SCS at the input of 6-0A is opposed by the low reference level (1SCR). Moreover, during the same time interval, the negative feedback across FET device 30TR, which is in a low impedance state, considerably reduces the gain of the overall current controller (6-0A, 8-0A). Accordingly, the arc current is caused by the thyristor gating module to follow a smooth curve ABC. At time $t_2$, the time delay (TD) has elapsed and FET device 30TR now changes under 1SMC (line 27) to the high impedance state. Therefore, the feedback loop from potentiometer 8P, via capacitors 37C, 38C, potentiometer 7P and resistor 125R no longer is shorted out by FET device 30TR. This loop will now control the dynamics of the current controller so that the controlled arc current effectively coasts by CD onto the desired level, as ascribed by the current reference. (The switch circuit 105 (FIG. 13A) has its FET device 29TR now in the high impedance state due to 2SMC from line 26). The selected current reference $C_{RF2}$ is now effective to provide the current setting for the current controller. It is observed that the time delay (TD) is so chosen that curve ABC can be obtained. It is neither too short that current cannot be established somewhat above the level of D, nor too long that C be brought under the level of D.

The gating pulse generator 57 within the thyristor gating module 110 need not be described here. It may be the same as the one shown in the aforementioned copending patent application, which for this purpose is hereby incorporated by reference. Also gate pulse suppression can also be applied to the control system according to the invention, and reference can also be made for the purpose of the description herein, to the said aforementioned copending application.

Reference is made to the article "Solid State Remote Controllable Welding Power Supplies", by J. E. Frederick, R. A. Morgan, and L. F. Stringer in Welding Journal, August 1978, pages 32–39, which is hereby incorporated by reference.

I claim:

1. In a direct current arc welder having an arc-gap supplied with power through SCR devices and saturating reactor means, a controller for said SCR device including voltage feedback control means operative to establish a predetermined constant voltage between said arc-gap and current feedback control means operating with a predetermined gain and under a predetermined reference signal to establish a predetermined constant current through said arc-gap; the combination of:

timer means initiated at start-up by a predetermined buildup of arc current under said constant voltage for establishing a time interval;

with said current feedback control means having a first operative mode under a reference signal substantially reduced from said predetermined reference signal and a gain reduced from said predetermined gain; a second operative mode under said predetermined reference signal and with said predetermined gain;

means responsive to initiation of said time interval for disabling said voltage feedback control means and for enabling said current feedback control means in the first mode, whereby arc-gap current is limited, by said current feedback control means and by said saturable reactor means concurrently, at the end of said time interval to a current level higher than said constant current level;

means responsive to expiration of said time interval for transferring said current feedback control means into the second mode; and feedback loop means associated with said current feedback control means and operative at the end of said time interval for smoothly lowering the arc-current from said higher level to said predetermined constant current level as a function of time.

* * * * *